United States Patent
Kono et al.

(10) Patent No.: US 6,780,067 B1
(45) Date of Patent: Aug. 24, 2004

(54) COMBINED INTEGRAL MOLDED PRODUCT USING PRE-MOLDED MEMBER

(75) Inventors: Tsutomu Kono, Kawasaki (JP); Makoto Iida, Kawasaki (JP); Naozumi Hatada, Yokohama (JP); Yoshimichi Nishimura, Hitachinaka (JP); Masayuki Doki, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/572,788

(22) Filed: May 17, 2000

(30) Foreign Application Priority Data

May 20, 1999 (JP) .......................................... 11-139688

(51) Int. Cl.⁷ .............................................. H01R 13/405
(52) U.S. Cl. .................................. 439/736; 264/272.17
(58) Field of Search ......................... 439/736; 29/883; 264/272.15, 272.14, 277, 272.11, 272.17, 271.1

(56) References Cited

U.S. PATENT DOCUMENTS

| | | | | |
|---|---|---|---|---|
| 4,574,474 A | * | 3/1986 | Langham | .................... 29/858 |
| 4,821,413 A | * | 4/1989 | Schmitt | ........................ 29/883 |
| 5,173,841 A | * | 12/1992 | Uenaka et al. | |
| 5,527,502 A | * | 6/1996 | Kiuchi et al. | ............... 264/250 |
| 5,737,188 A | * | 4/1998 | Flierl et al. | ................. 361/715 |
| 6,076,258 A | * | 6/2000 | Abe | ............................ 29/883 |
| 6,152,761 A | * | 11/2000 | Wellinsky et al. | .......... 439/736 |
| 6,180,045 B1 | * | 1/2001 | Brandenburg | .......... 264/272.15 |
| 6,187,242 B1 | * | 2/2001 | Onoda | ........................ 264/277 |

* cited by examiner

*Primary Examiner*—Neil Abrams
(74) *Attorney, Agent, or Firm*—Mattingly, Stanger & Malur, P.C.

(57) ABSTRACT

One or more pre-molded resin inserts (2) are placed in a metal mold and an outer molded resin body (3) is formed about the insert. The cooling speed is increased by: forming the insert with projections (21) to space a rear part of the insert from walls of the metal mold so that molten resin flows into position about the insert; forming convex parts (22) on portions of the outer resin body adjacent the insert (2); forming recesses (23) in the molded outer housing, the recesses extending between the inserts and formed to receive fins of a front metal mold part; forming plural pin carrier inserts as one unit; or forming the inserts as layered bodies. This increases heat transfer from the outer body molten material to the cooler metal mold parts at regions adjacent to the pre-molded insert.

4 Claims, 18 Drawing Sheets

FIG. 5

| TIME | TEMPERATURE DISTRIBUTION IN THICKNESS DIRECTION OF MOLTEN RESIN | ANALYSIS MODEL AND METHOD OF CALCULATING HEAT FLUX |
|---|---|---|
| AFTER COMPLETION OF CHARGING = $t_1$ s | METAL MOLD; THICKNESS POSITION OF MOLTEN RESIN vs TEMPERATURE (°C); $T_1$ PRE-MOLD, $T_2$; $\theta > 0$, $q > 0$; $\theta > 0$, $q > 0$ | ANALYSIS MODEL: MOLTEN PLASTIC (t3), TEMPERATURE MEASURING POINT, 100, 150, PRE-MOLD (t6) |
| AFTER COMPLETION OF CHARGING = $t_2$ s | METAL MOLD; $\theta > 0$, $q > 0$; $\theta \doteq 0$, $q \doteq 0$; $T_1$ PRE-MOLD, TEMPERATURE (°C) $T_2$ | METHOD OF CALCULATING HEAT FLUX: MOLTEN PLASTIC, $T_1$, $\theta$, $T_2$, $T_3$, n, T, PRE-MOLD |
| AFTER COMPLETION OF CHARGING = $t_3$ s | METAL MOLD; $\theta > 0$, $q > 0$; $\theta < 0$, $q < 0$; $T_1$ PRE-MOLD, TEMPERATURE (°C) $T_2$ | $Q/A = q = \alpha(\Delta T)$<br>$dQ/dA = q = -\lambda \, \delta T/\delta n$<br>$= -\lambda \cdot \theta$<br>$(Q(W), A(m^2), q(W/m^2),$<br>$\alpha(W/m^2/°C), \lambda(W/m/°C), T(°C))$ |

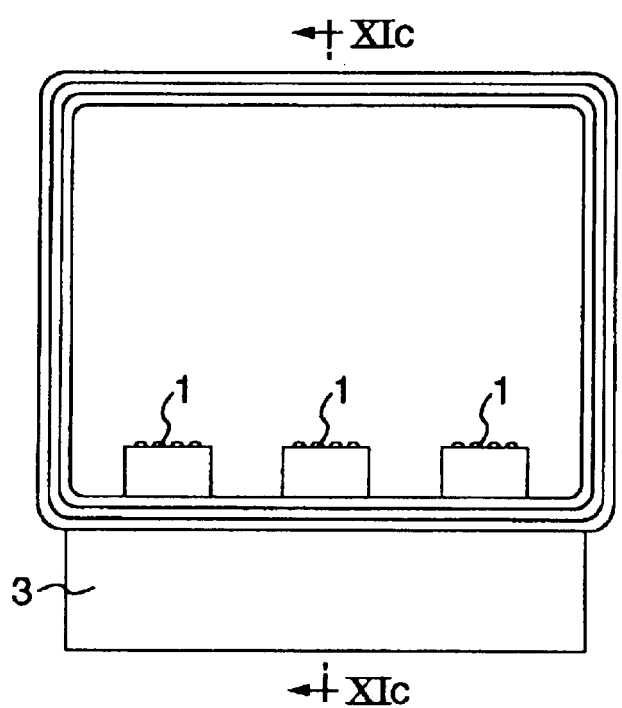
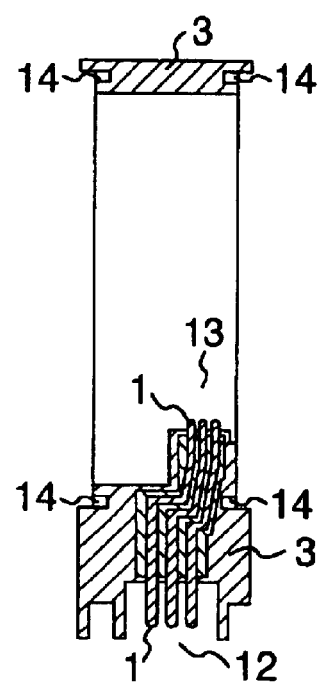
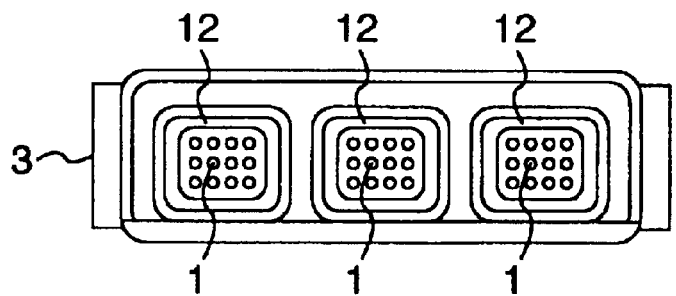
FIG. 11a
FIG. 11c
FIG. 11b

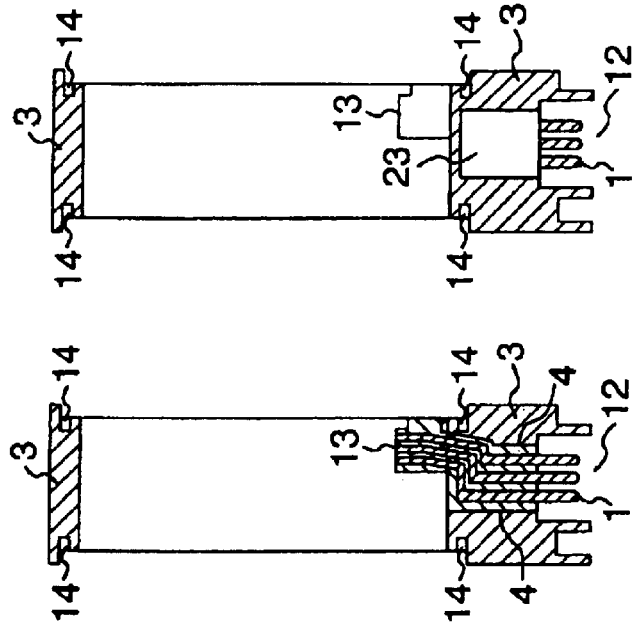
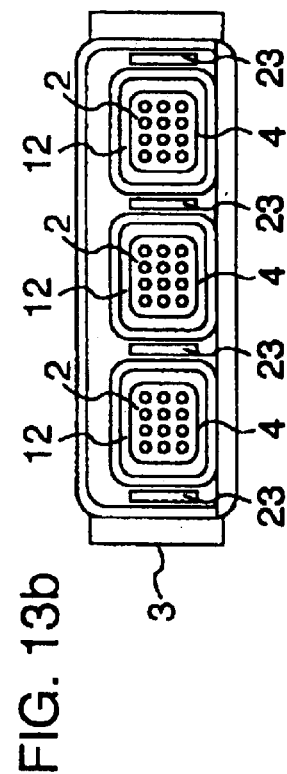
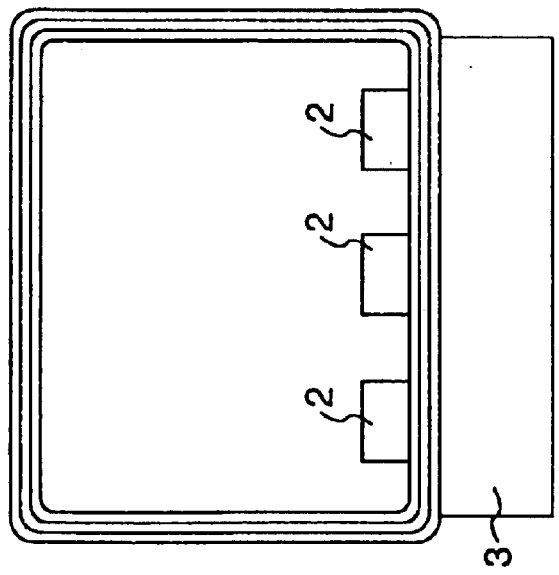

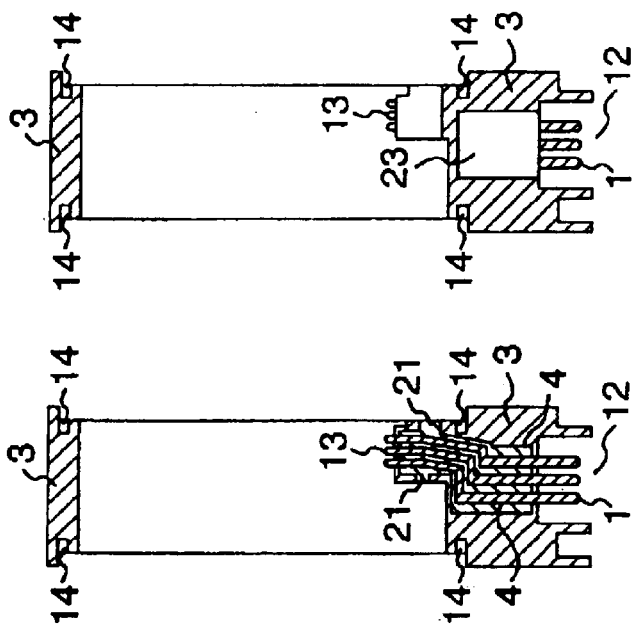
FIG. 14d
FIG. 14c
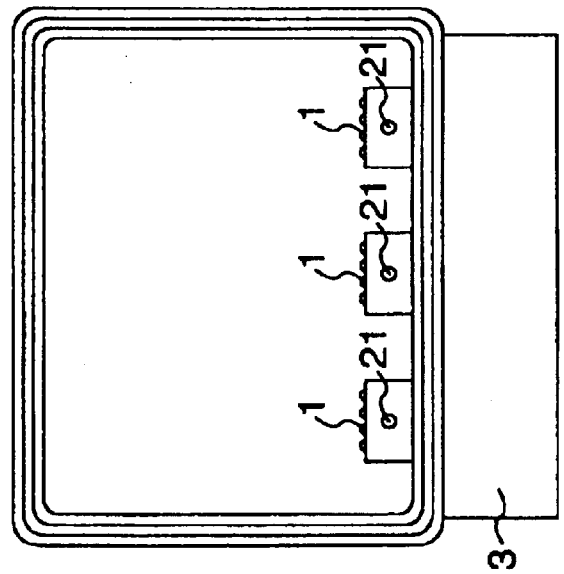
FIG. 14a
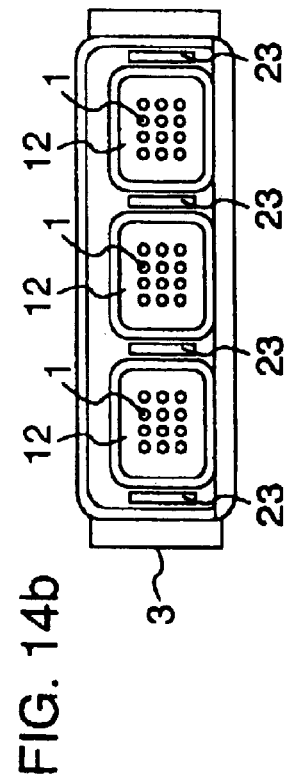
FIG. 14b

COMBINED INTEGRAL MOLDED PRODUCT USING PRE-MOLDED MEMBER

BACKGROUND OF THE INVENTION

The present invention relates to a combined integral molding technique between plastic materials, and particularly to a structure of a combined integral molded product of a pre-molded member requiring watertight property and airtight property.

An electronic device part having a connector portion for electrically connection to an external system has a plurality of wiring terminals in the connector portion. Therefore, there is a problem that the wiring is broken due to a resin pressure at a time of integrally molding the wiring with a resin.

In order to prevent the breaking of the wiring due to the resin pressure, as employed in an LSI package, there is frequently employed a wiring of a lead frame configuration structured so as to fix each of the wires by connecting an outer peripheral portion of the wires.

However, even in the case of employing the wiring of lead frame configuration described above, a rigidity of the wires becomes low when a cross sectional area of each of the wires becomes small. Therefore, there is generated an increased possibility that the wiring is broken due to the resin pressure upon integral molding. In order to prevent the breaking of the wiring due to the resin pressure, it is possible to consider a forming method in which each of the wires is fixed by pre-molding the wiring at a low resin pressure and an area on which the resin pressure is applied at an insert-molding.

As a semiconductor apparatus having the above described structure that the wiring is pre-molded, there is a structure that a terminal arrangement is fixed by pre-molding terminals for connection to an external system, as shown in JP-A-8-148642.

As described above, in order to prevent the terminals from being broken, it is effective to employ the structure in which each of the terminals is fixed by pre-molding and thereafter the pre-molded member is integrally molded with a polymeric material. However, the pre-molded member molded with the polymeric material has a significantly low heat conductivity in comparison with a metal material employed in a metal mold. Therefore, a cooling speed of the integrally molding resin becomes slow in a boundary portion between the pre-molded member and the integrally molding resin. The boundary portion tends to be a final cooled portion of the integrally molding resin. Therefore, a void is generated in the boundary portion due to shrinkage till the integrally molding resin is solidified, and a peeling or separation between the pre-molded member and the integrally molding resin is easily generated. Due to the void and the peeling or separation, airtight property and watertight property are deteriorated. As a result, there is generated a problem that it is impossible to satisfy a product specification such as a reliability.

BRIEF SUMMARY OF THE INVENTION

Accordingly, an object of the present invention is to provide a structure which can keep airtight property and watertight property of an electronic device part even in the case that a void and a peeling or separation are generated at a time of using a pre-molded member of wiring and integrally molding the pre-molded member.

In order to achieve the above described object, in accordance with the present invention, there is provided a structure which can keep an airtight property and a water-tight property of an electronic device part even when a void and a peeling or separation are generated, by integrally molding a pre-molded member with an integrally molding resin in a state that a resin portion of the pre-molded member except a portion necessary for fixing the pre-molded member within a metal mold is surrounded by the integrally molding resin.

Further, it is possible to prevent the void and the peeling or separation from being generated by forming a recess in the integrally molding resin near the pre-molded member, in order to increase a cooling performance of the integrally molding resin, at a time of integrally molding the pre-molded member.

BRIEF DESCRIPTION OF THE SEVERAL VIEWS OF THE DRAWING

FIG. 1d is a cross sectional view taken along a line Id—Id in FIG. 1a;

FIG. 2c is a cross sectional view taken along a line IIc—IIc in FIG. 2a;

FIG. 2d is a cross sectional view taken along a line IId—IId in FIG. 2a;

FIG. 4c is a cross sectional view taken along a line IVc—IVc in FIG. 4a;

FIG. 5 is a view showing a result of analysis about a temperature distribution in a thickness direction at a time of a combined integral molding;

FIG. 6c is a cross sectional view taken along a line VIc—VIc in FIG. 6a;

FIG. 6d is a cross sectional view taken along a line VId—VId in FIG. 6a;

FIG. 7c is a cross sectional view taken along a line VIIc—VIIc in FIG. 7a;

FIG. 7d is a cross sectional view taken along a line VIId—VIId in FIG. 7a;

FIG. 9c is a cross sectional view taken along a line IXc—IXc in FIG. 9a;

FIG. 11a is a front view of a structure of a combined integrally molded product using pre-molded members;

FIG. 11b is a bottom view of the structure of the combined integrally molded product using the pre-molded members;

FIG. 11c is a cross sectional view taken along a line XIc—XIc in FIG. 11a;

FIG. 12c is a cross sectional view taken along a line XIIc—XIIc in FIG. 12a;

FIG. 12d is a cross sectional view taken along a line XIId—XIId in FIG. 12a;

FIG. 12e is a cross sectional view taken along a line XIIe—XIIe in FIG. 12a;

FIG. 13a is a front view of a structure of a combined integrally molded product using pre-molded members;

FIG. 13b is a bottom view of the structure of the combined integrally molded product using the pre-molded members;

FIG. 13c is a cross sectional view taken along a line XIIIc—XIIIc in FIG. 13a;

FIG. 13d is a cross sectional view taken along a line XIIId—XIIId in FIG. 13a;

FIG. 14a is a front view of a structure of a combined integrally molded product using pre-molded members;

FIG. 14b is a bottom view of the structure of the combined integrally molded product using the pre-molded members;

FIG. 14c is a cross sectional view taken along a line XIVc—XIVC in FIG. 14a;

FIG. 14d is a cross sectional view taken along a line XIVd—XIVd in FIG. 14a;

FIG. 15d is a cross sectional view taken along a line XVd—XVd in FIG. 15a;

FIG. 16c is a cross sectional view taken along a line XVIc—XVIc in FIG. 16a;

FIG. 17d is a cross sectional view taken along a line XVIId—XVIId in FIG. 17a;

FIG. 18c is a cross sectional view taken along a line XVIIIc—XVIIIc in FIG. 18a.

DETAILED DESCRIPTION OF THE INVENTION

A description will be given below of embodiments in accordance with the present invention with reference to the accompanying drawings.

At first, as a basic structure of a combined integrally molded product in accordance with the present invention, a structure of a member in which metal electric wires 1 are pre-molded by a pre-molding resin 2 is shown in FIGS. 1a–1d, and a combined integrally molded product obtained by insert-molding three pre-molded members with an insert-molding resin 3 is shown in FIGS. 2a–2d. In this case, only a portion of the wires 1 is pre-molded at a low resin pressure in order to prevent the wires from being broken. In this case, when employing the pre-mold forming, there is also an advantage that it is possible to prevent a high resin pressure of the insert-molding for forming the combined integrally molded product from being directly applied to the wires 1.

In this case, for a material employed for the pre-molding resin 2 and the insert-molding resin 3, it is possible to employ a thermoplastic polymer material such as a PBT resin (a polybutylene terephthalate), an ABS resin (an acrylonitrile butadiene styrene), a PP resin (a polypropylene), a PS resin (a polystyrene) and the like, a thermosetting polymer material such as an epoxy resin, a phenol resin and the like, or a material obtained by adding a filler such as an inorganic material such as a glass fiber and the like, an organic material such as a carbon fiber and the like, a metal material or the like to the polymer materials.

In this case, in the following description, a description will be given of an embodiment that a material obtained by adding 30 wt % of glass fiber to the PBT resin is employed for the pre-molding resin 2 and the insert-molding resin 3.

Figure 1A:
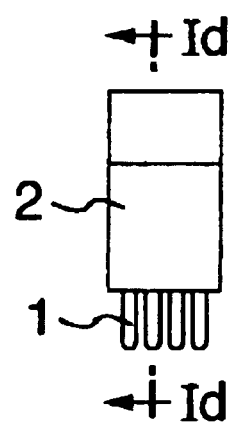
FIG. 1a is a front view of a pre-molded member.
Figure 1C:
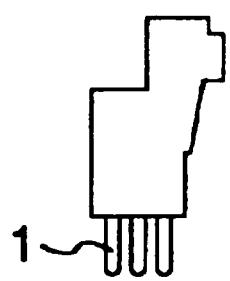
FIG. 1c is a side view of the pre-molded member.
Figure 1D:
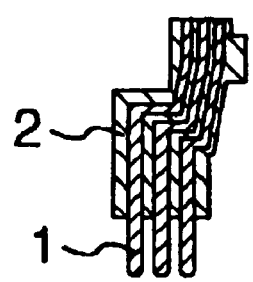
Figure 1B:
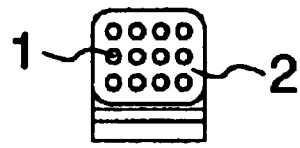
FIG. 1b is a bottom view of the pre-molded member.
Figure 2A:
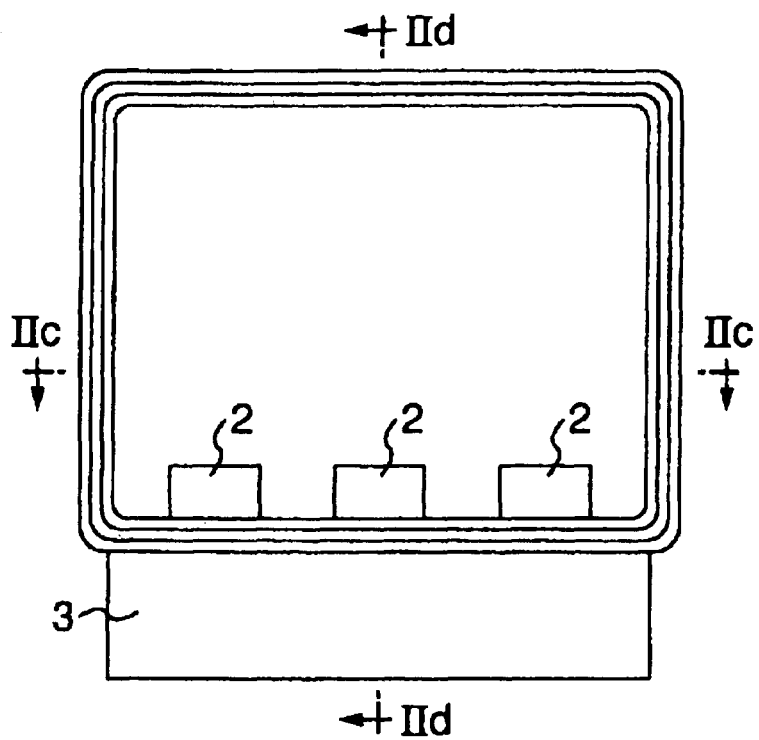
FIG. 2a is a front view of a structure of a combined integrally molded product using pre-molded members.
Figure 2D:
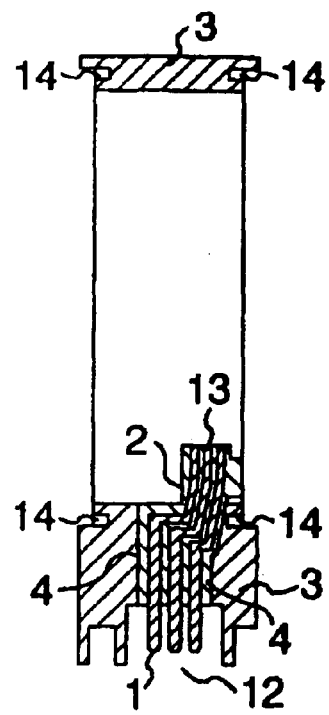
Figure 2B:
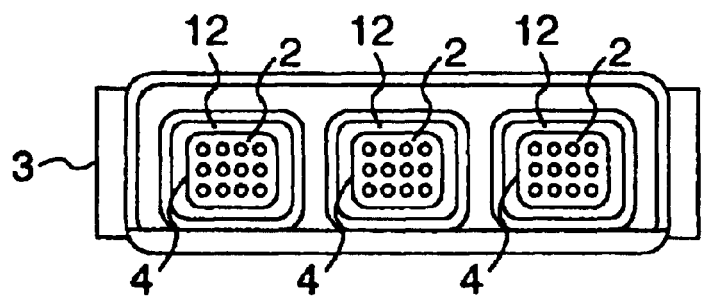
FIG. 2b is a bottom view of the structure of the combined integrally molded product using the pre-molded members.
Figure 2C:
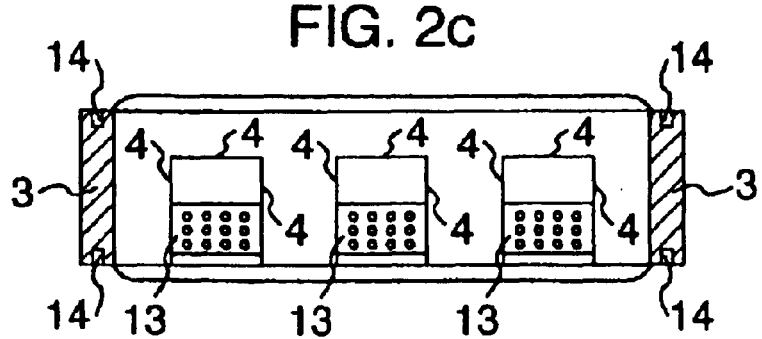
Figure 3:
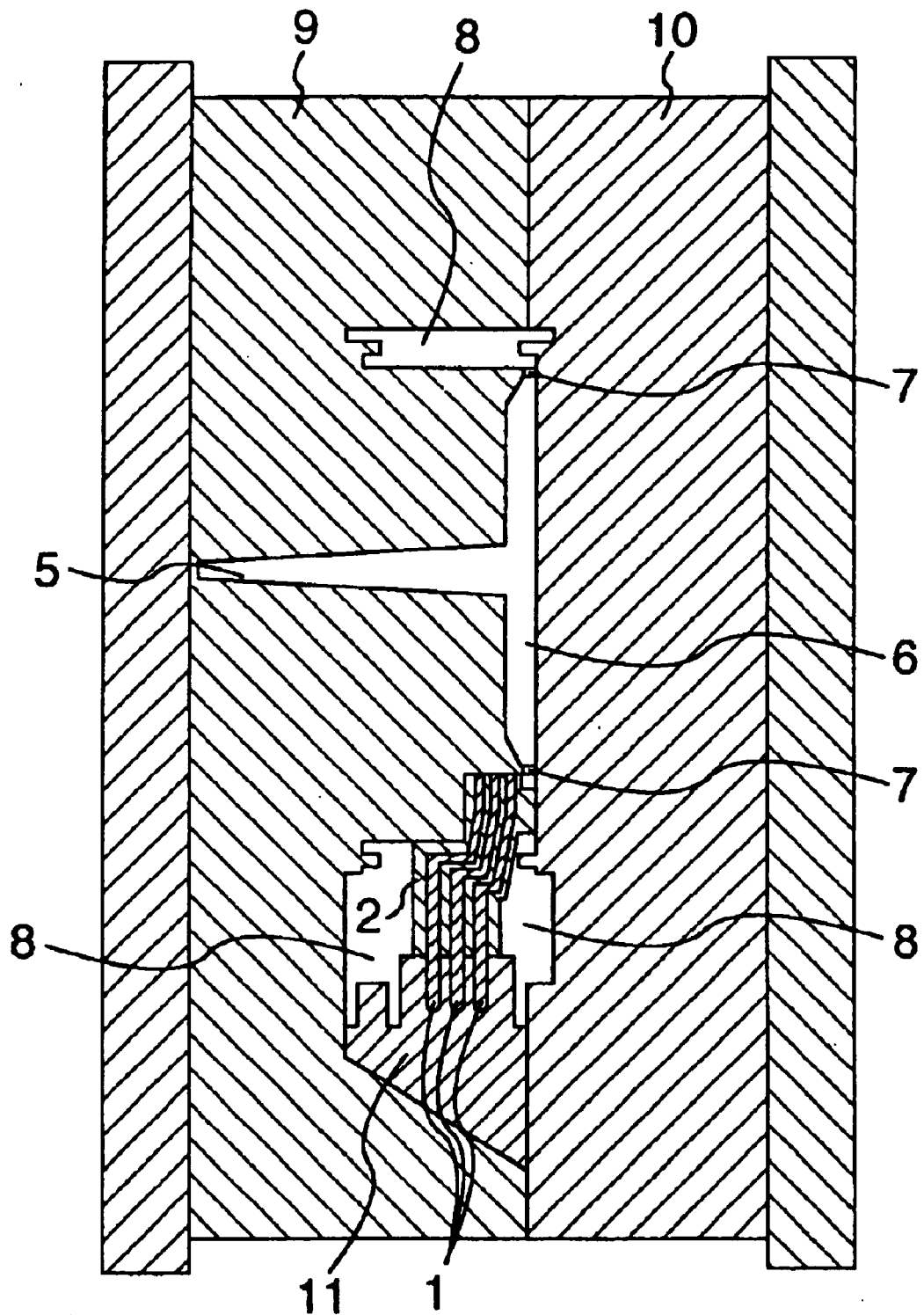
FIG. 3 is a cross sectional view showing a structure of a metal mold clamp for the pre-molded member.
Figure 4A:
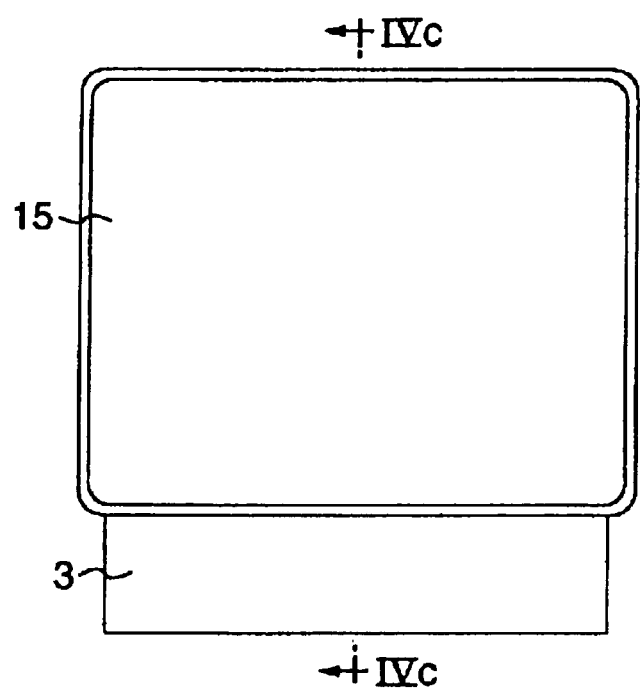
FIG. 4a is a front view of a structure of an electronic device using a combined integrally molded product.
Figure 4C:
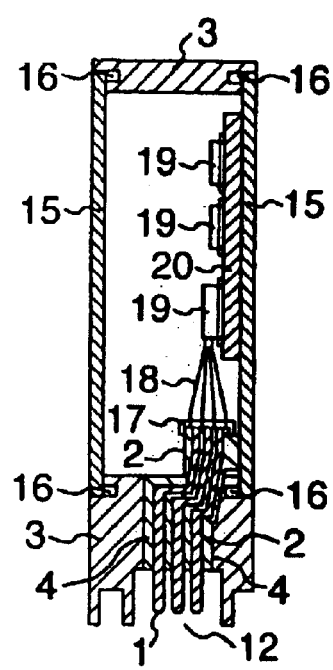
Figure 4B:
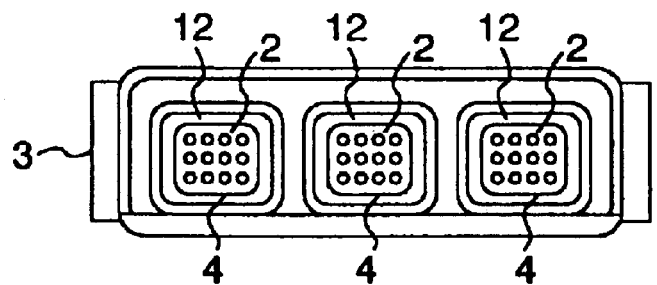
FIG. 4b is a bottom view of the structure of the electronic device using the combined integrally molded product.
Figure 6A:
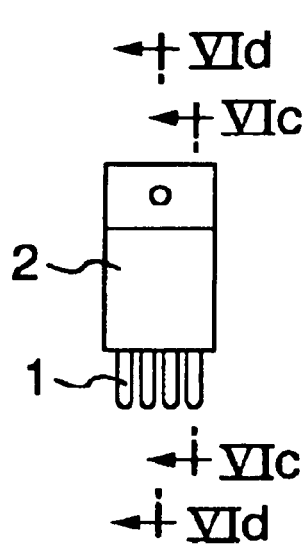
FIG. 6a is a front view of a pre-molded member having projections.
Figure 6C:
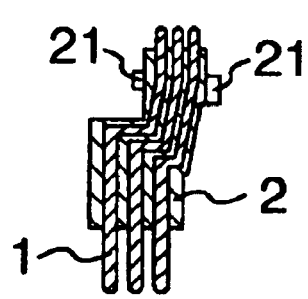
Figure 6D:
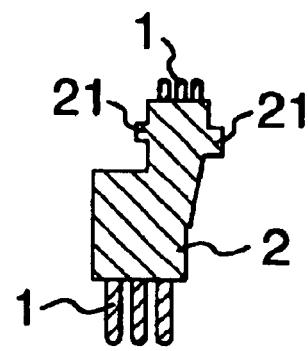
Figure 6B:
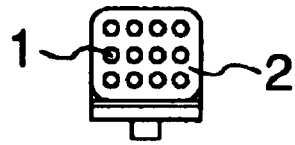
FIG. 6b is a bottom view of the pre-molded member having the projections.
Figure 7A:
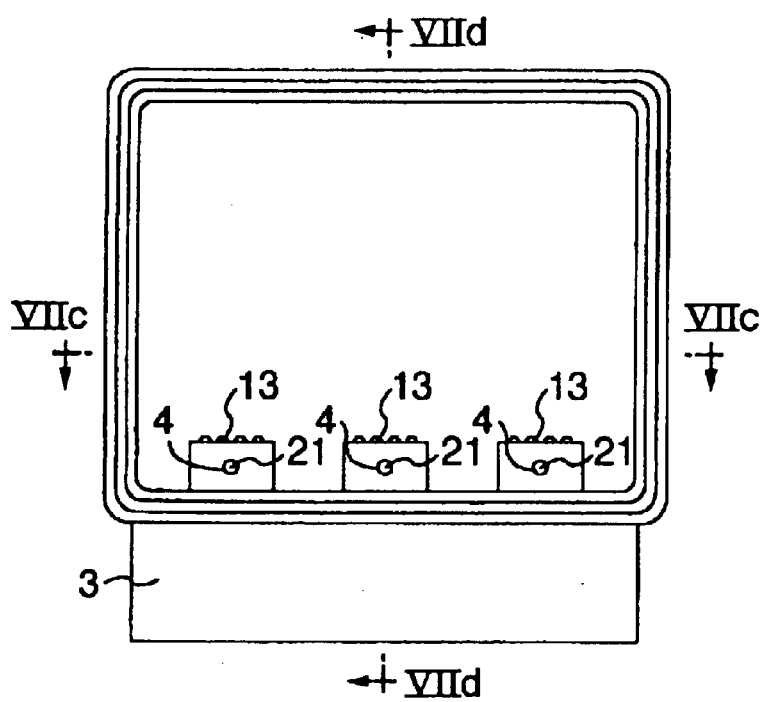
FIG. 7a is a front view of a structure of a combined integrally molded product using a pre-molded member.
Figure 7D:
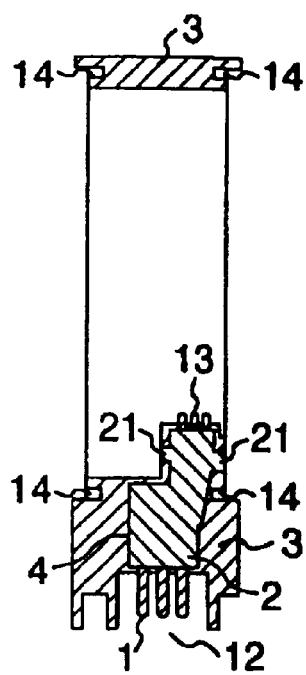
Figure 7B:
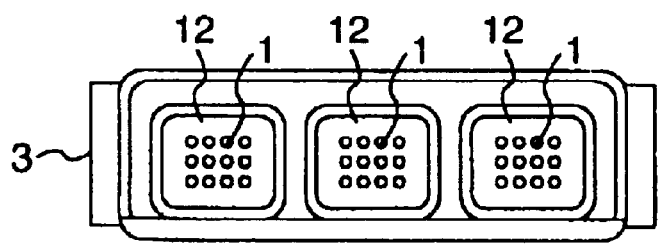
FIG. 7b is a bottom view of the structure of the combined integrally molded product using the pre-molded member.
Figure 7C:
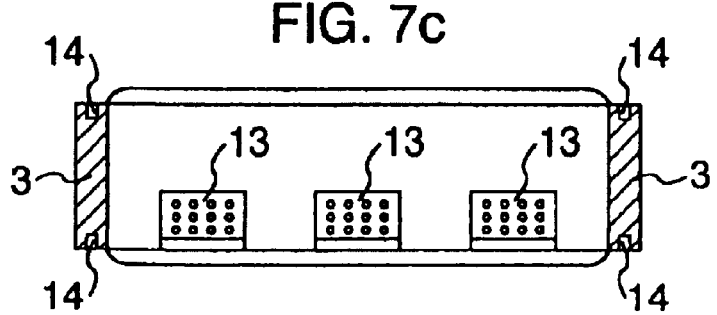

Here, as a method of producing the combined integrally molded product shown in FIGS. 2a–2d, a structure of inserting the pre-molded member within the metal mold is shown in FIG. 3. A combined integrally molded product is obtained by charging the insert-molding resin 3 within a cavity 8 via a spool 5, a runner 6 and a gate 7 with employing an injection molding method in a state of fixing the pre-molded member by a movable metal mold 9, a stationary metal mold 10 and a clamp using a slide block 11. In this case, the combined integrally molded product shown in FIGS. 2a–2d has three connector portions 12 for electric signal connection to an external system, and constitutes an electronic device part by inserting a circuit board having electronic elements mounted thereon within the molded product. A structure of this electronic device part is shown in FIGS. 4a–4c. Packing 16 are inserted to upper and lower grooves in the combined integrally molded product shown in FIGS. 2a–2d for the purpose of improving airtight property and watertight property and metal plates 15 are put on the packing 16. In this case, a circuit board 20 having electronic elements 19 mounted thereon is arranged on the metal plate 15, and inner connectors 13 of the pre-molded member and the electronic elements 19 are connected to each other by wires. The outer connectors 12 are employed so as to electrically connect the electronic device to the external system.

As described above, the basic structure of the combined integrally molded product in accordance with the present invention has been explained. However, it is considered that the molten resin charged within the cavity 8 for insert-molding the combined integrally molded product shown in FIGS. 2a–2d is hard to be cooled near the pre-molded member formed by the polymeric material.

In this combined integral molding between the polymeric materials, a result obtained by calculating a temperature distribution in accordance with an analysis (moldflow) in a thickness direction of a molten resin is shown in FIG. 5. As described above, the material obtained by charging 30 wt % of glass fiber to the PBT resin is employed for the pre-molding resin 2 and the insert-molding resin 3. In this case, as an analysis model, used is a shape obtained by integrally molding a molten resin having a thickness of 3 mm after inserting a pre-molded member having a length of 150 mm, a width of 100 mm and a thickness of 6 mm within the metal mold, and the temperature distribution in a thickness direction of a center portion of the molded product is calculated.

FIG. 5 shows a temperature distribution of the molten resin in the thickness direction at a time when t1, t2 and t3 (sec.) has passed after the charging is finished, and in each graph, an upper portion of the graph shows a cooling state in contact with the metal mold and a lower portion thereof shows a cooling state in contact with the pre-molded member. In this case, positive and negative values of a heat flux of the molten resin in a place in contact with the metal mold and a place in contact with the pre-molded member are calculated from $q=-\lambda \cdot \theta$, wherein $\theta$ (° C./m). denotes a temperature gradient and $\lambda$ (W/m/° C.) denotes a heat conductivity.

Accordingly, when t1 (sec.) has passed after the charging is finished, the heat flux q of the surface of the pre-molded member becomes larger than 0 and the molten resin is cooled by the surface of the pre-molded member. However, when t2 (sec.) has passed, the heat flux of the surface of pre-molded member nearly equals to 0 and a heat movement between the molten resin and the pre-mold resin is not performed. Further, when t3 (sec.) has passed, the heat is inversely moved from the surface of the pre-molded member to the molten resin, and it is found that also the surface of the pre-molded member is cooled by the metal mold with which the molten resin is in contact.

The temperature distribution of the molten resin in the thickness direction is also dependent upon a thickness ratio between the pre-molding resin and the molten resin. However, it can be found that the place in contact with the pre-molded member is the final cooled portion in the thickness direction of the molten resin. Accordingly, it is considered that there is generated a problem that peeling or separation and voids are generated in a boundary portion between the pre-molded member and the molten resin since the resin in the final cooled portion shrinks after the other portions are cooled and solidified. Due to the generation of the peeling or separation and the voids, airtight property and watertight property are impaired in boundary portion 4 between the pre-molded member and the insert-molding resin shown in FIGS. 2a–2d, whereby inferiority is generated.

A description will be given of a structure of a molded product for preventing inferiority due to the void and the peeling or separation.

Figure 8:
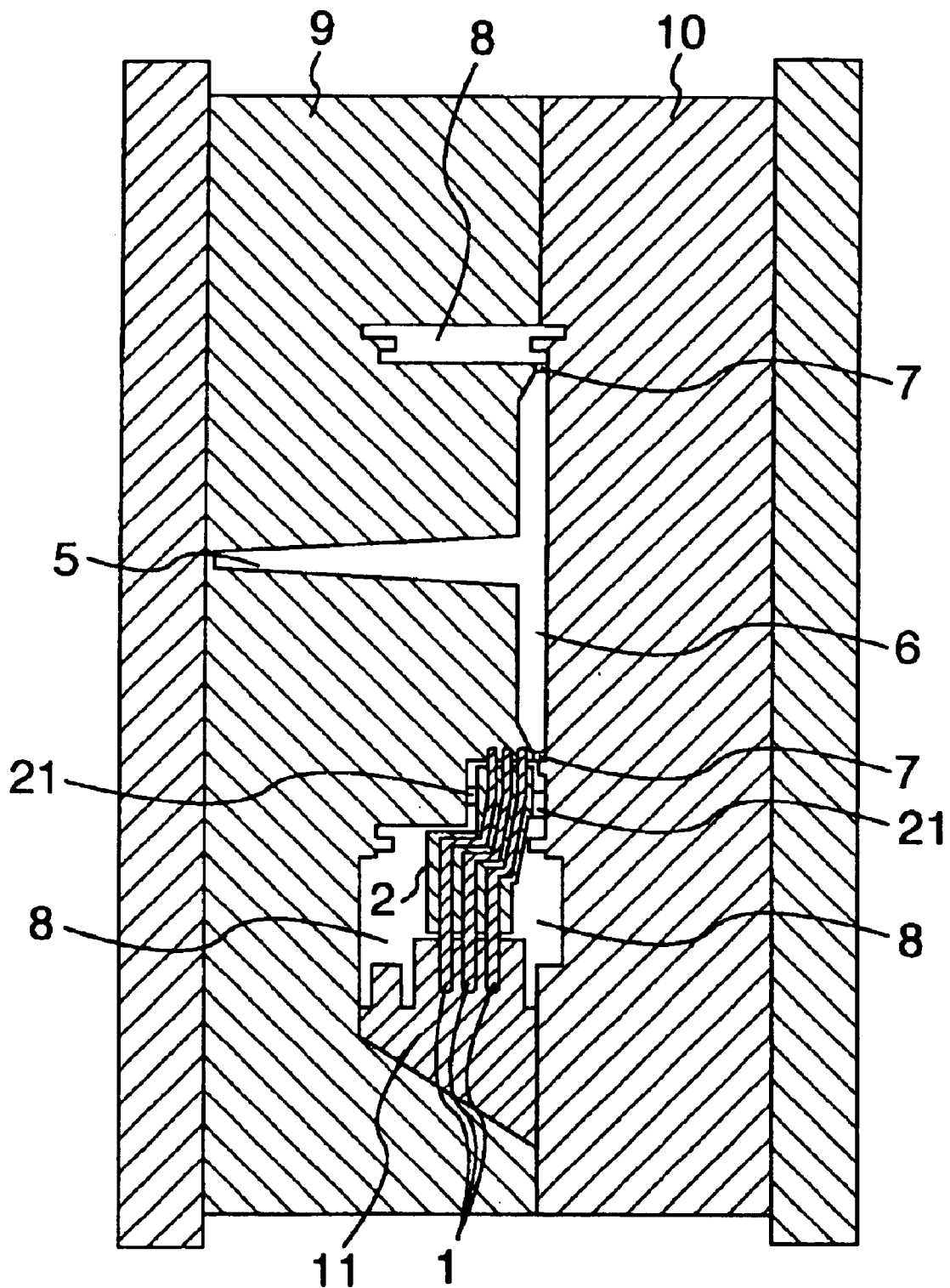
FIG. 8 is a cross sectional view showing a structure of a metal mold clamp for a pre-molded member.

FIGS. 6a–6d show a structure in which projections 21 are formed in the pre-molded member. FIGS. 7a–7d show a structure for insert-molding the pre-molded member in a state that the resin portion of the pre-molded member except the projections 21 required for fixing the pre-molded member within the metal mold is surrounded. When employing this structure, the resin portion of the pre-molded member is surrounded by the insert-molding resin also in the surface of the outer connectors 12 for connection to the external system. Therefore, even when the peeling or separation and the void are generated near the pre-molded member, the boundary portion 4 between the resin portion of the pre-molded member and the insert-molding resin does not appear on the surface of the molded product. Accordingly, the present combined integrally molded product is structured so as to keep airtight property and watertight property even when the peeling or separation and the void are generated. In this case, as means for producing the combined integrally molded product shown in FIGS. 7a–7d, a structure for inserting the pre-molded member within the metal mold is shown in FIG. 8. The combined integrally molded product is obtained by charging the insert-molding resin 3 within the cavity 8 via the spool 5, the runner 6 and the gate 7 with using the injection molding method in a state that the projections 21 of the pre-molded member are fixed by the movable metal mold 9 and the stationary metal mold 10.

Figure 9A:
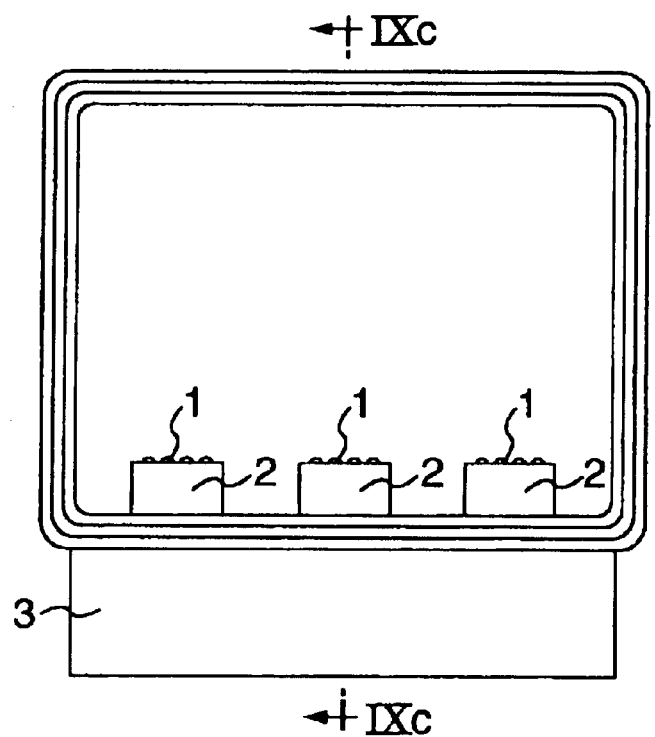
FIG. 9a is a front view of a structure of a combined integrally molded product using pre-molded members.
Figure 9C:
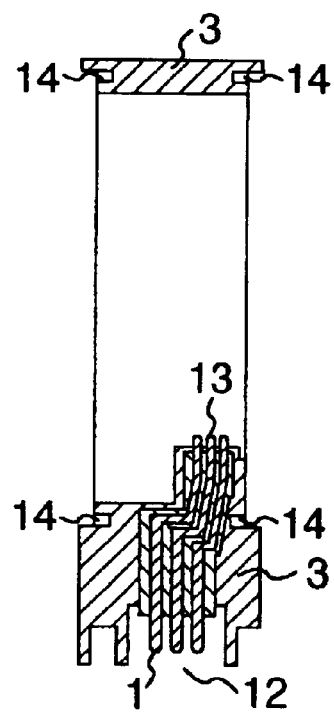
Figure 9B:
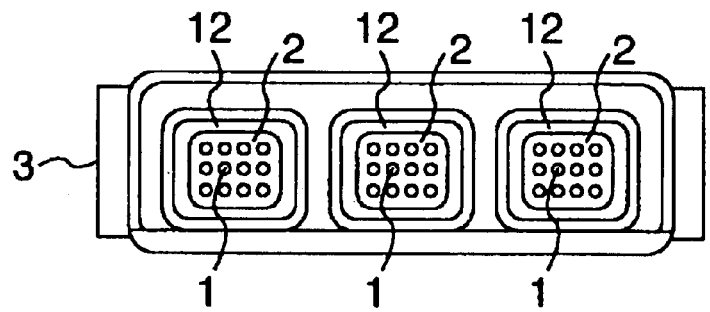
FIG. 9b is a bottom view of the structure of the combined integrally molded product using the pre-molded members.
Figure 10:
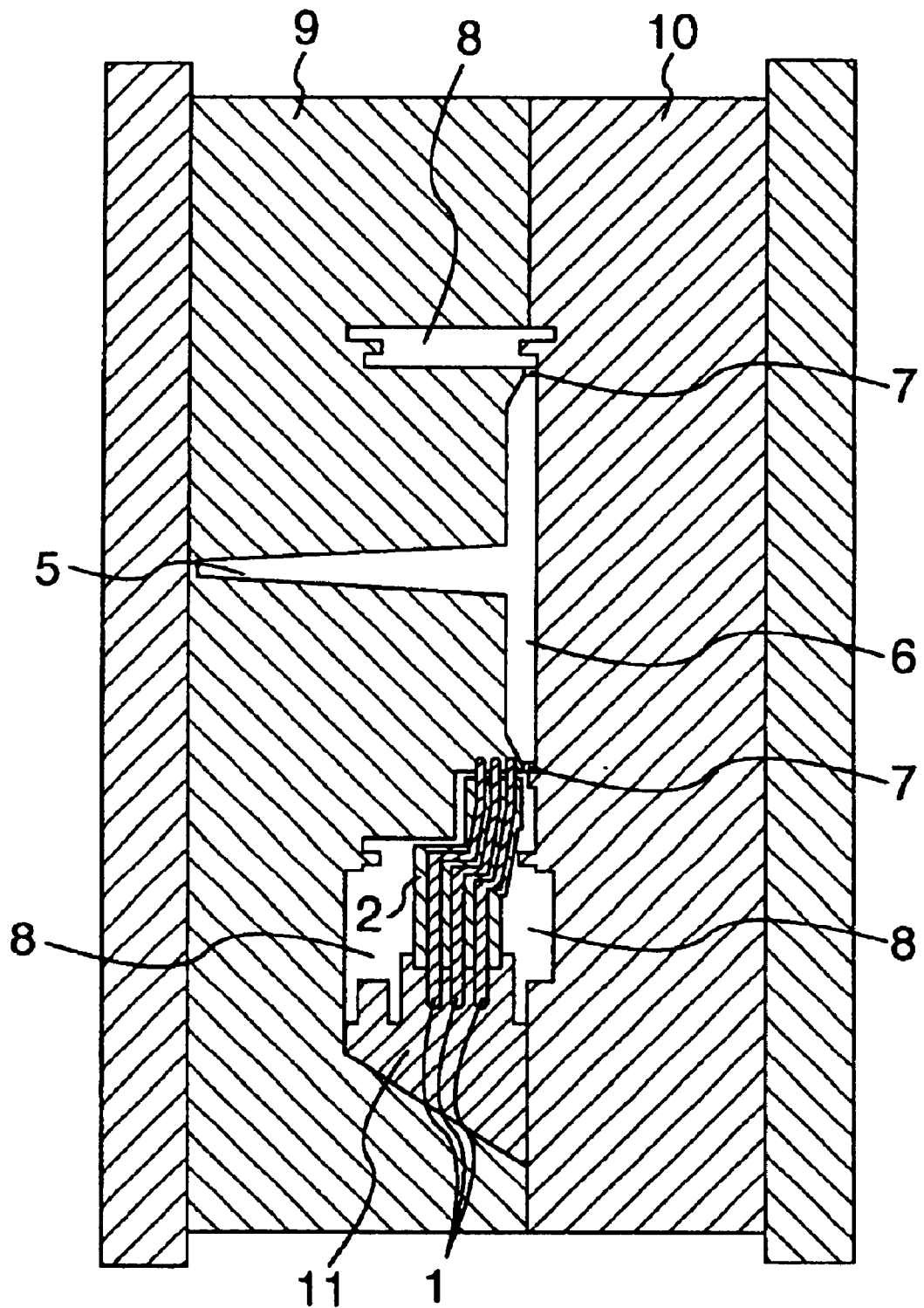
FIG. 10 is a cross sectional view showing a structure of a metal mold clamp for a pre-molded member.
Figure 12A:
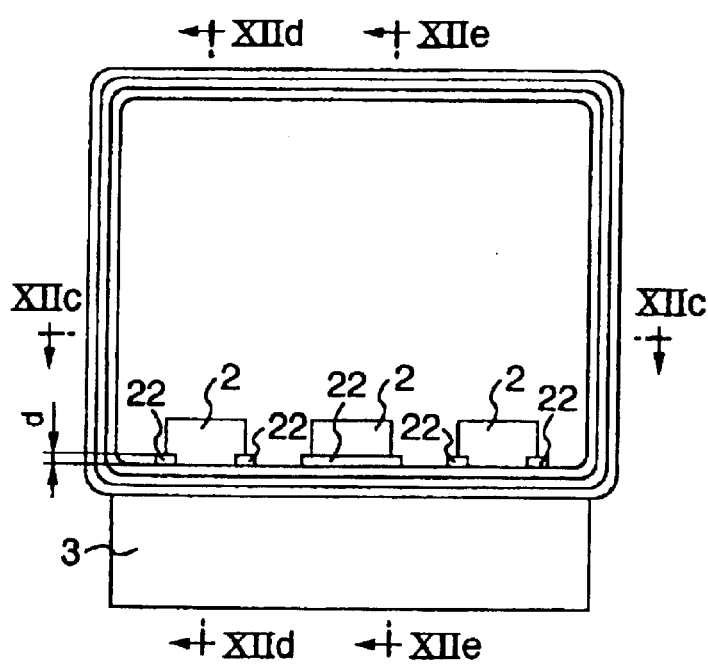
FIG. 12a is a front view of a structure of a combined integrally molded product using pre-molded members.
Figure 12D:
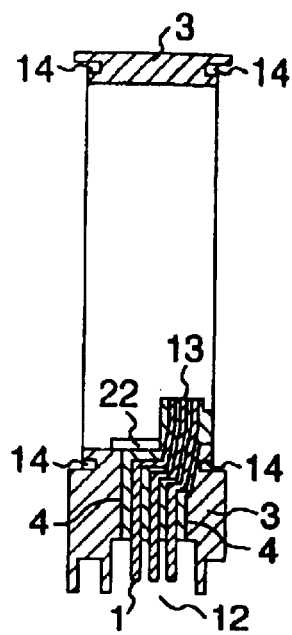
Figure 12B:
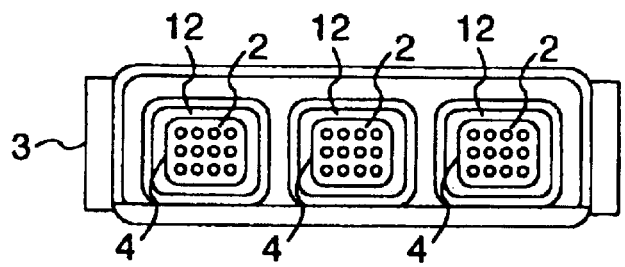
FIG. 12b is a bottom view of the structure of the combined integrally molded product using the pre-molded members.
Figure 12C:
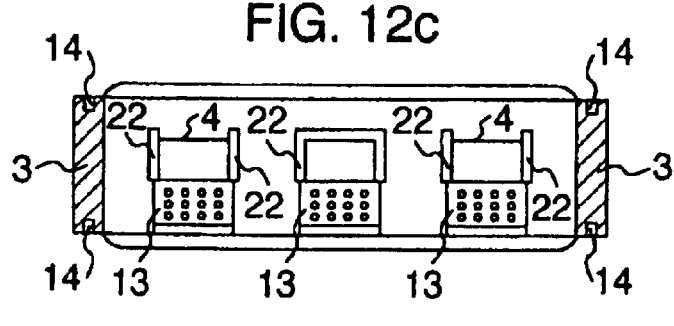
Figure 12E:
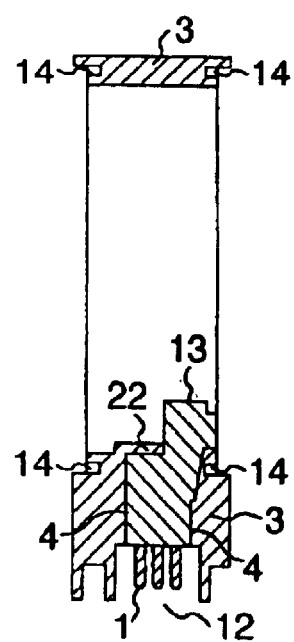
Figure 15A:
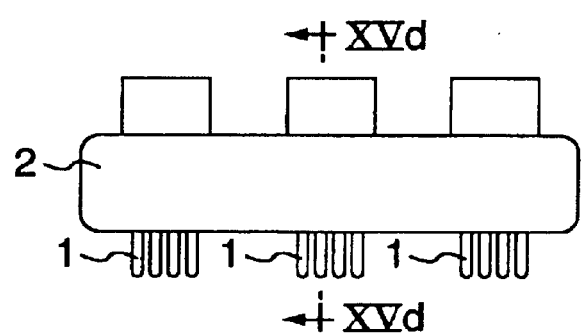
FIG. 15a is a front view of a pre-molded member in which wiring to be used to a plurality of connectors is molded together.
Figure 15C:
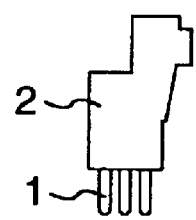
FIG. 15c is a side view of the pre-molded member in which wiring to be used to a plurality of connectors is molded together.
Figure 15D:
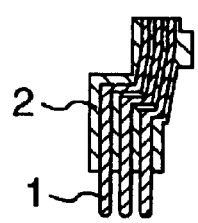
Figure 15B:
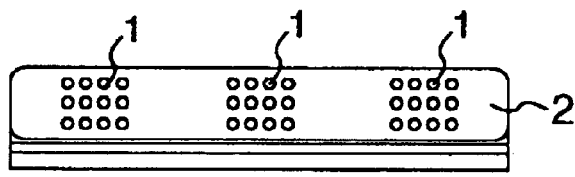
FIG. 15b is a bottom view of the pre-molded member in which wiring to be used to a plurality of connectors is molded together.

FIGS. 9a–9c show a combined integrally molded product which is formed by insert-molding the pre-molded member shown in FIGS. 1a–1d by fixing only a part of the resin portion on a side of the outer connectors 12 and the wires 1 by the metal molds. A part of the resin portion of the pre-molded member on a side of the inner connectors 13 is surrounded by the insert-molding resin. Therefore, there can be provided a structure which can keep airtight property and watertight property even when the void and the peeling or separation are generated in the boundary portion between the pre-molded member and the insert-molding resin. In this case, a structure for inserting the pre-molded member within the metal molds is shown in FIG. 10. As described above, the pre-molded member can be insert-molded in a state that it is fixed by the slide block 11. Further, FIGS. 11a–11c show a structure in which only the wires are fixed to the metal molds at a time of insert-molding so as to surround all of the pre-molded portion of the polymeric material.

As described above, there are shown embodiments of the combined integrally molded products in each of which the resin portion of the pre-molded member is surrounded by the insert-molding resin. However, the present invention is not limited to these embodiments. Any shape of the pre-molded member and any shape of the fixing projection 21 can be employed.

FIGS. 12a–12e show a structure in which airtight property and watertight property are hard to be impaired by the boundary portion 4 between the pre-molded member and the insert-molding resin on a surface of the inner connectors 13 in the combined integrally molded product shown in FIGS. 2a–2d. In this case, a convex portion 22 is formed by the insert-molding on the boundary portion 4 between the pre-molded member and the insert-molding resin. The convex portion 22 partially surrounds the pre-molded part and the thickness d of the portion of the convex portion 22 surrounding the pre-molded part is thinner than that of the other portions. Therefore, the insert-molding resin under molten state is well cooled from the metal mold side, so that the peeling or separation and the void are hard to be generated. Further, it is possible to enlarge the contact area between the pre-molded part and the insert-molding resin and therefore, the probability that voids pass through the side of the outer connector 12 and the side of the inner connector 13. In this case, any shape of the convex portion 22 may be employed and an arranging place thereof may be suitably selected.

As described above, there are shown the structures in which airtight property and watertight property of the electronic device part can be kept by suitably surrounding the pre-molded member even in the case that the void and the peeling or separation are generated.

FIGS. 13a–13d show a structure in which recesses 23 are formed in the insert-molding resin at a portion between two pre-molded members and a portion near the pre-molded members and the thickness of these portions is made thinner. With this structure, it is possible to improve the performance to be cooled of the portions in the vicinity of the pre-molded members, which are hard to be cooled, by holding the pre-molded members at the metal mold and by inserting a part of the slide block 11 the portion between the pre-molded members and the portion near the pre-molded members as shown in FIGS. 3, 8 and 10. By increasing a cooling speed of the portion near the pre-molded members corresponding to the final cooled portion of the insert-molding resin 3, it is possible to obtain a structure in which the peeling or separation and the void are hard to be generated. The recess 23 can be buried in accordance with a process such as an injection molding, a potting or the like after the molding. The recess 23 can have any shape, and an arranging portion of the recess 23 can be optionally selected. Further, FIGS. 14a–14d show a structure of a combined integrally molded product in which the pre-molded member having the clamping projections 21 shown in FIGS. 6a–6d is used and the recess 23 is formed.

Figure 16A:
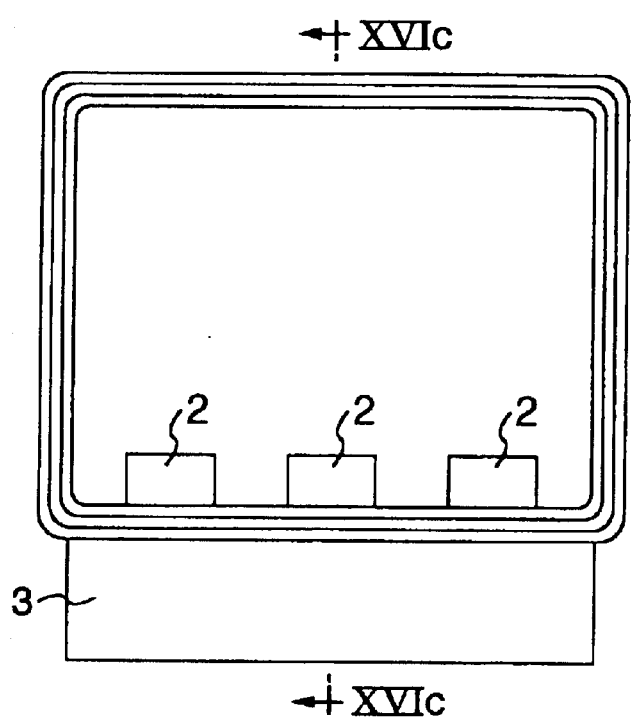
FIG. 16a is a front view of a structure of a combined integrally molded product using a pre-molded member.
Figure 16C:
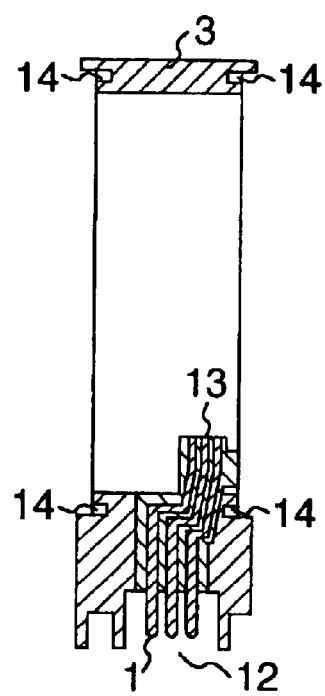
Figure 16B:
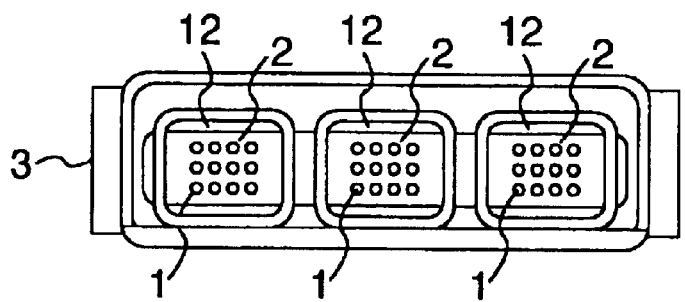
FIG. 16b is a bottom view of the structure of the combined integrally molded product using the pre-molded member.
Figure 17A:
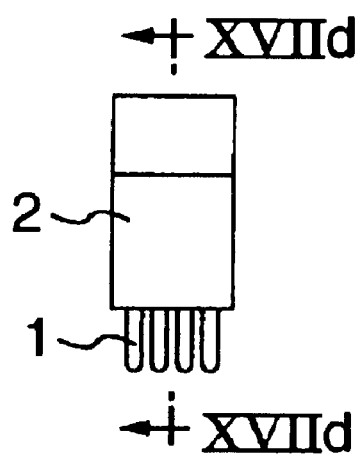
FIG. 17a is a front view of a pre-molded member comprising pre-molded pieces respectively separately formed.
Figure 17C:
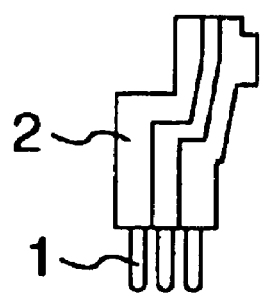
FIG. 17c is a side view of the pre-molded member comprising pre-molded pieces respectively separately formed.
Figure 17D:
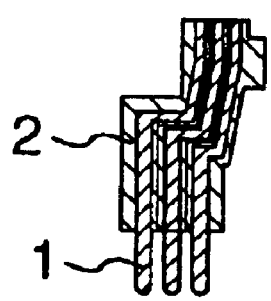
Figure 17B:
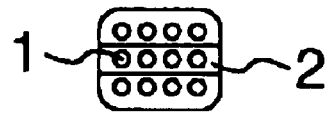
FIG. 17b is a bottom view of the pre-molded member comprising pre-molded pieces respectively separately formed.

FIGS. 15a–15d show a structure in which three pre-molded members shown in FIGS. 1a–1d are integrally premolded, and FIGS. 16a–16c show a combined integrally molded product obtained by insert-molding the pre-molded member shown in FIGS. 15a–15d. In this case, by integrally forming a plurality of pre-molded members as one unit, it is possible to prevent the peeling or separation and the void from occurring at portions between the plurality of pre-molded members where have an inferior cooling performance. The integrally formed pre-molded member can be formed in an optional shape, and it is possible to insert-mold by suitably surrounding the integrally formed pre-molded member, and it is possible to form the recess in an optional place of the combined integrally molded product.

Figure 18A:
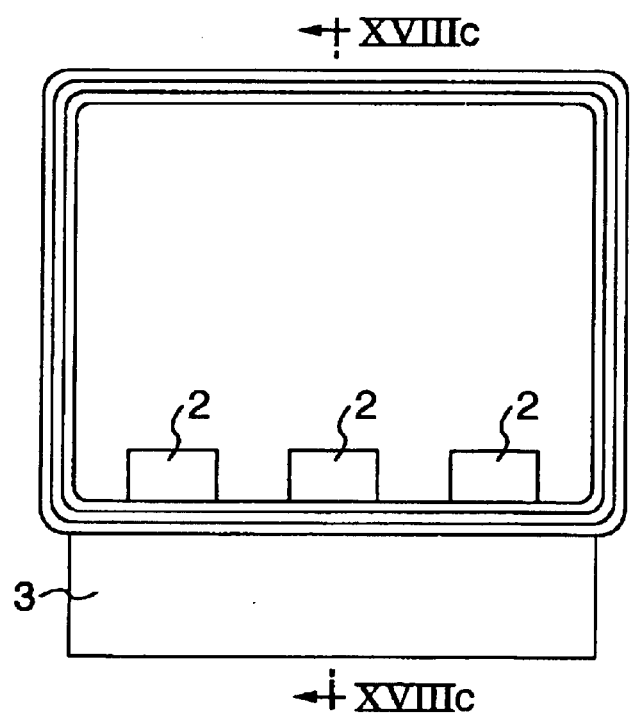
FIG. 18a is a front view of a structure of a combined integrally molded product using pre-molded members.
Figure 18C:
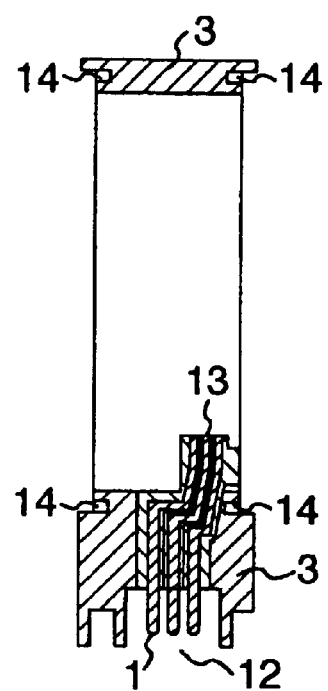
Figure 18B:
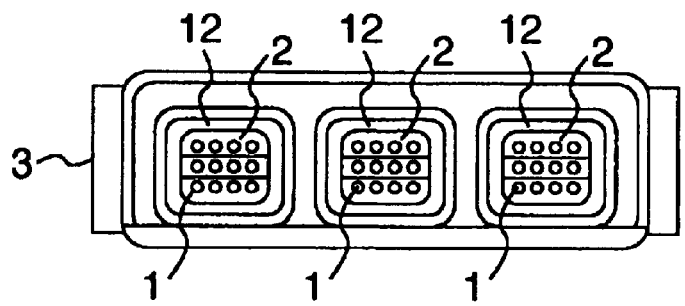
FIG. 18b is a bottom view of the structure of the combined integrally molded product using the pre-molded members.

FIGS. 18a–18c show a structure in which the pre-molded member shown in FIG. 1 is separated into three pieces and the pieces are layered. In this manner, it is possible to mold at a low resin pressure by limiting a pre-molding range, and therefore, it is possible to obtain lower probability of the breaking of the wires at a time of pre-molding. Further, FIGS. 18a–18c show a combined integrally molded product obtained by insert-molding the three pieces pre-molded members. In this case, the pre-molded member is formed in an any shape, and it is possible to employ a shape obtained by separating the pre-molded member having a plurality of integrally formed connectors shown in FIGS. 15a–15d into three pieces. Further, it is possible to suitably surround the pre-molded pieces to insert-mold them, and to form the recess in a suitable place of the combined integrally molded product.

In the above description, the embodiments in which the material obtained by adding 30 wt % of the glass fiber to the PBT resin is employed for the pre-molding resin 2 and the insert-molding resin 3. However, the present invention is not limited to this resin, and a combination of any polymeric materials can be employed. For example, it is also possible to employ the material obtained by adding 30 wt % of the glass fiber to the PBT resin for the insert-molding resin 3 and employ the material obtained by adding the glass fiber having a charging rate lower than 30 wt % to the PBT resin or the material obtained by adding no glass fiber for the pre-molding resin 2. The pre-molded member has a low heat resistance because it has low charging rate of the glass fiber. Accordingly, when insert-molding the pre-molded member with the insert-molding resin 3, the surface of the pre-molded member becomes easily melted by the temperature of the insert-molding resin 3. Consequently, it is possible to improve a bonding performance between the pre-molded member and the insert-molding resin 3.

Further, by previously coating PBT resin film in which no glass fiber is added and which has low heat resistance, rubber or the like over the pre-molded member in which glass fibers are added to the PBT resin and by insert-molding the pre-molded member, it is also possible to improve a bonding performance between the pre-molded member and the insert-molding resin 3. In this case, it is possible to employ any polymeric material for the pre-coat material, and it is possible to suitable determine a film thickness of the pre-coat to be applied and an area to be applied.

Further, it is also possible to improve a bonding performance by forming fine projections having a size equal to or less than 1 mm on the surface of the pre-molded member and melting the projections having a small heat capacity by the temperature of the insert-molding resin 3. The shape of the projection can be optionally determined.

As described above, according to the structure of the combined integrally molded product using the pre-molded member in accordance with the present invention, in order to improve a cooling performance of the resin integrally molding the portion near the pre-molded member made of the resin having a low heat conductivity, the metal material such as the protruding pin or the like is employed and a plurality of resin pre-molded pieces are integrally formed into one member, whereby it is possible to reduce the generation of the void and the peeling or separation. Further, it is possible to increase airtight property and watertight property of the combined integrally molded product by surrounding the boundary between the pre-molded member and the insert-molding resin to integrally mold. Further, it is possible to improve a bonding performance between the integrally-molding (insert-molding) resin and the pre-molded member by employing the material obtained by adding the filler for the integrally molding resin and employing the material having a low heat resistance and obtained by adding no filler for the pre-molding resin.

We claim:

1. An electronic device comprising:

a combined integrally molded product having a frame like shape;

at least one electronic element located in a space within the frame like shape of said combined integrally molded product; and cover plates sealingly covering the frame like shape of said combined integrally molded product;

said combined integrally molded product comprising at least one pre-molded member, in which wiring terminals for connecting said electronic element with outside terminals are molded by a pre-molding resin, and an injection molding resin part by which said at least one pre-molded member is integrally injection molded by an injection molding resin, wherein said at least one pre-molded member is located to extend forwardly from the injection molding resin region in the combined integrally molded product to form mold clamp areas on opposite surfaces thereof to be clamped by molds upon injection molding, and a boundary between the pre-molding resin and the injection molding resin appears in only outer surface of said combined integrally molded product.

2. An electronic device according to claim 1, wherein said areas to be clamped by the molds upon injection molding comprise areas located outside the space within the frame like shape of said combined integrally molded product, and the boundary appears only in the outer surface of said combined integrally molded product.

3. An electronic device according to claim 1, wherein said at least one pre-molded member comprises a plurality of pre-molded members and a recess is formed between adjacent pre-molded members.

4. An electronic device according to claim 2, wherein said at least one pre-molded member comprises a plurality of pre-molded members and a recess is formed between adjacent pre-molded members.

* * * * *